Feb. 5, 1946.　　　G. B. PIRNIE　　　2,394,201
REFRIGERATING AND CONDITIONING SYSTEM FOR VEHICLES
Filed April 17, 1942　　　2 Sheets-Sheet 2
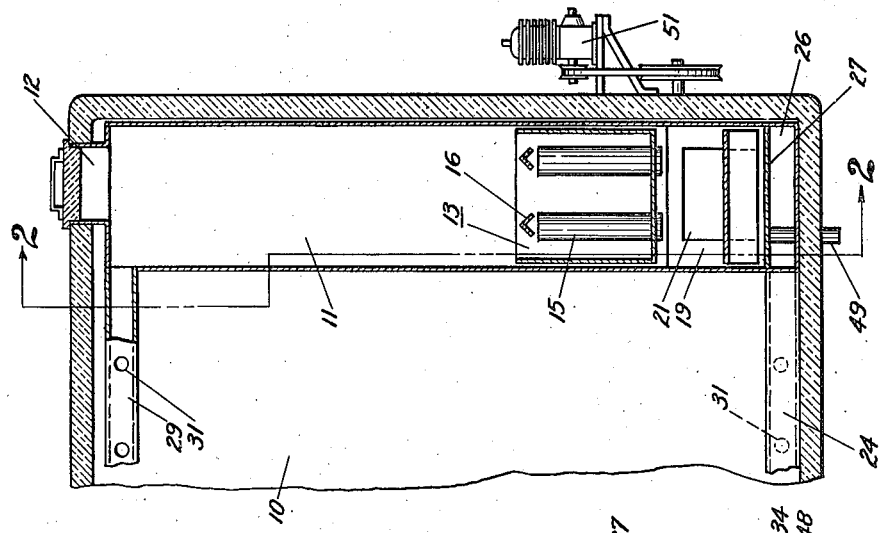
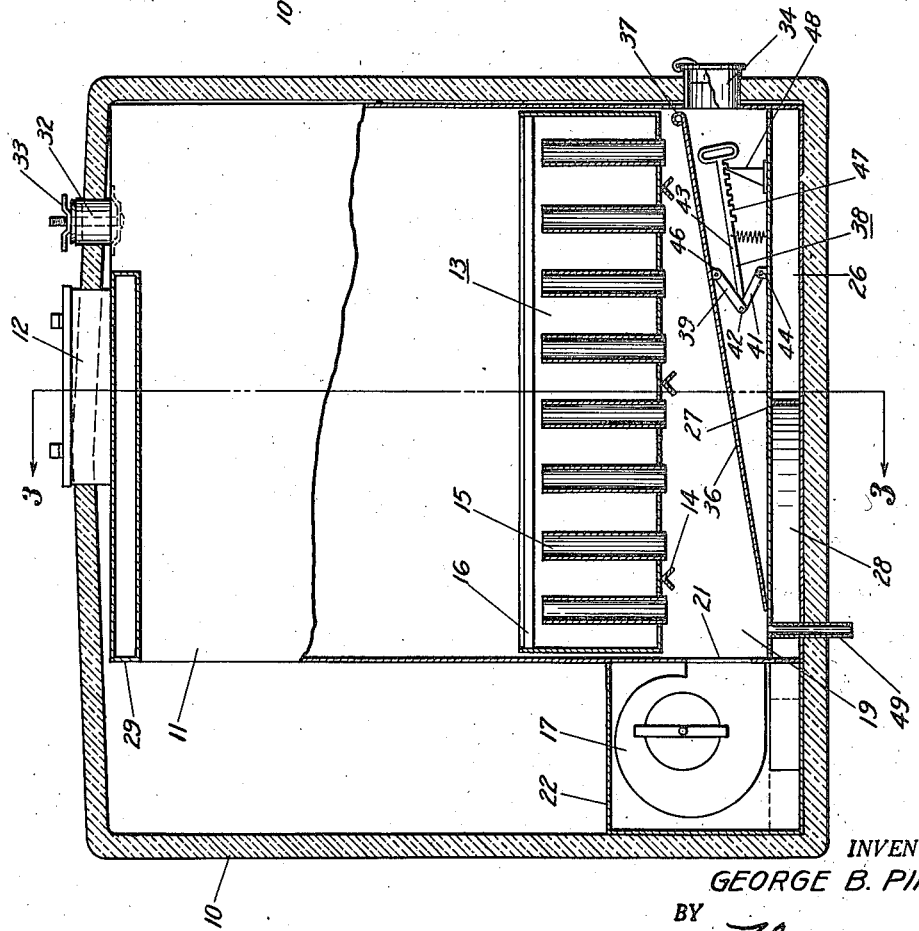
INVENTOR.
GEORGE B. PIRNIE
BY Flournoy Corey.
ATTORNEY.

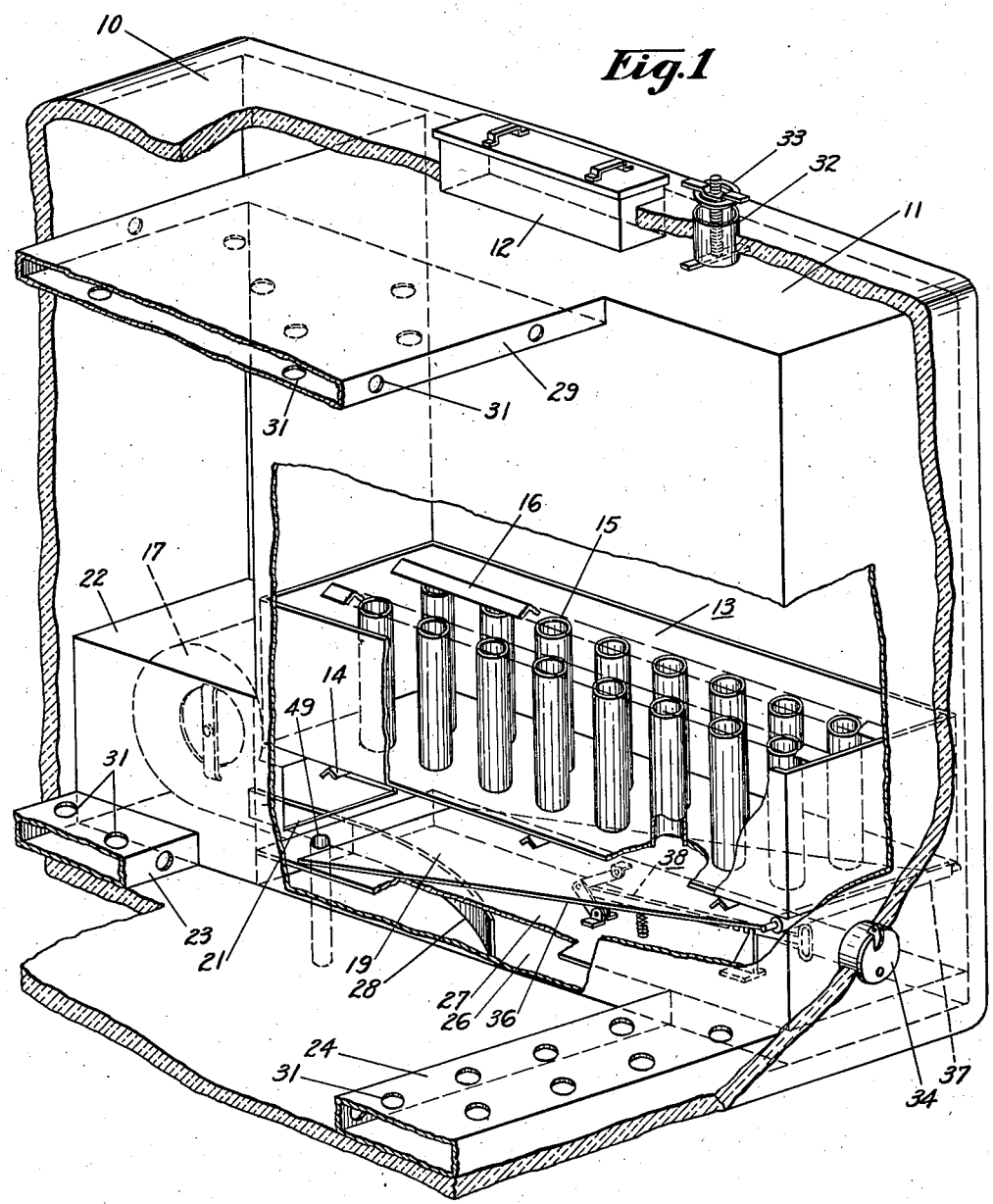

Patented Feb. 5, 1946

2,394,201

UNITED STATES PATENT OFFICE 2,394,201

REFRIGERATING AND CONDITIONING SYSTEM FOR VEHICLES

George B. Pirnie, Center Point, Iowa

Application April 17, 1942, Serial No. 439,382

7 Claims. (Cl. 62—133)

This invention relates to air cooling and conditioning devices and has particular relation to devices of this nature utilizing salt or the like in conjunction with ice in the cooling and conditioning of produce transport trucks and refrigerator cars or the like.

In the transportation of fruits, vegetables and meats, by motor transport or by rail, it is necessary for the most part to provide some sort of refrigeration and particularly so during the hot months when it is impossible to ship most fresh foodstuffs even short distances without refrigeration without considerable spoilage resulting.

The usual method of refrigerating such produce transport vehicles is to provide an ice bunker in the end of the car or truck and fill the bunker with chopped ice and a given amount of salt or like melting accelerating agent. The equipment of this nature employed in the past has been generally very inefficient and unsatisfactory probably because of inefficiency of method of application of the melting agent to the ice, and it has been very difficult to provide any really satisfactory degree of refrigeration for anything but the shortest hauls. Further inefficiency resulted because the structures provided prevented good distribution of the cooled air throughout the entire storage space.

This lack of satisfactory refrigeration has been particularly noticeable with the equipment available to transport produce of the nature of berries, which mold and ferment very easily.

It is accordingly among the objects of my invention to provide improved means for conditioning and cooling the air within produce transport trucks and rail cars or the like or other closed spaces, and particularly improved means for applying salt and brine to the ice and for circulating cooled air.

Other objects of my invention are the provision of improved means for employing ice in the refrigeration of such vehicles, and improved systems for circulating and using the brine and for obtaining the highest possible efficiency of cooling and securing the greatest possible cooling effect from the ice.

A further object of my invention is the provision of means for improving the efficiency of such refrigeration and conditioning units, both as regards heat absorption of the ice and circulation and distribution of the air within the vehicle.

A still further object of my invention is the provision, in such a refrigerating device, of an improved system and means for changing or freshening the air within the storage space.

Another object of my invention is the provision of an extremely simple and inexpensive ice and salt cooling system, for devices of this character in which the brine, although not contained in a closed system, is not subject to the heavy loss of salt by washing action which occurs in the usual type of ice bunker.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is a more or less diagrammatic view in perspective of a refrigerating and conditioning unit constructed in accordance with a preferred embodiment of my invention. The device is shown as mounted in one end of a truck body and the walls of the device are broken away in several places to better illustrate the structure.

Figure 2 is a view, partly in elevation and partly in section, of the device illustrated in Figure 1 and taken along the line 2—2 of Figure 3, and Figure 3 is a vertical longitudinal section of the device illustrated in Figures 1 and 2 and taken along the line 3—3 of Figure 2.

Referring now to the drawings:

I have illustrated at 10 the broken-away end section of a truck or railway refrigerator car box within the end of which is mounted the ice bunker 11, which may be filled, in accordance with the usual practice, with cracked ice through the insulated door opening 12 in the top of the car body. This ice bunker is preferably constructed of heavy sheet metal so as to be substantially water tight.

A brine tank, which I have indicated generally at 13, is supported at a spaced distance above the floor of the bunker on a plurality of cross members such as the angle irons indicated at 14, which members are welded at their ends to the sides of the ice bunker. The brine tank 13 is made somewhat shorter and narrower than the inside of the bunker so as to permit air to pass upwardly from the air space 19 below the brine tank, around and over the outer surfaces of the brine tank.

A plurality of relatively large sheet metal tubes 15, somewhat shorter than the height of the brine tank, are welded into place at spaced intervals along the bottom of this tank, after openings substantially the size of the pipes have been cut in the bottom of the tank, so as to permit air from the air space below the tank to pass upwardly through the tubes as well as around the outer surfaces of the tank. The angle members 16, or ice baffles, are welded into place to the ends of the brine tank in such position as to extend across the open tops of the tubes 15 to prevent ice in the bunker from falling through the tubes.

A blower 17 is mounted so as to discharge into the air space 19 below the brine tank through the blower discharge opening 21. The blower 17 is enclosed in an airtight casing 22 at one side of which is connected a return air duct 23 extending longitudinally along one bottom side of the space to be refrigerated. The blower is preferably of the type having intakes at both ends with one end connected so as to receive air from a second return air conduit 24 located along the opposite bottom side of the space being conditioned. This return air conduit is connected to a space 26 provided in the bottom of the ice bunker by means of a false floor 27, and the air is conducted through this space to one side of the blower. The baffle 28 is provided to equalize the suction of the blower on the two return air conduits.

The conditioned-air supply conduit 29 is preferably placed along the top or ceiling of the refrigerator car or truck body and is connected into the ice bunker 11 at a point high as possible. Both the return and supply conduits 23, 24 and 29 are provided with a large number of spaced perforations 31 so as to cause a complete and even distribution of air throughout the entire storage space. If desired, a slatted false floor, not shown, may be constructed above the return conduits.

A fresh air inlet for the ice bunker may be provided as indicated at 32, and this inlet may be provided with a screw type cover 33 so as to permit the intake to be completely sealed. An opening 34, having a hinged door, may be provided in the end of the air space 19 in the ice bunker below the brine tank so as to permit air drawn through the bunker by the blower 17 to be exhausted through the opening 34.

A baffle plate 36 is preferably provided so as to direct air from the blower upwardly against the bottom of the brine tank and upwardly through the tubes. This baffle plate is disposed diagonally within the air space 19 with its end farthest from the blower pivotally supported, between the side walls of the ice bunker, as indicated at 37. When it is desired to pass fresh air through the load of produce, the fresh air intake 32 is of course opened. The exhaust opening 34 is also opened and the baffle 36 swung upwardly against the open lower ends of the tubes 15 by means of the toggle mechanism indicated generally at 38. This mechanism, which is best shown in Figure 2, includes a pair of toggle arms 39 and 41 hinged to each other and to a control arm 43 as shown at 42, the toggle arms also being pivotally secured, as at 44 and 46, to the false floor 27 and to the baffle 36 respectively. The control arm 43 is provided with a plurality of notches 47 arranged to be selectively engaged to a pedestal-like member 48. The operator may reach through the air exhaust opening 34 to operate the toggle mechanism to lift or lower the baffle plate 36 as desired.

A waste water drain 49 is provided for carrying off the waste water from the ice bunker and brine tank.

The operation of the unit is as follows:

The ice bunker is charged with ice and salt in the usual manner. The blower, which is energized by means of a gas engine 51 mounted on the outside of the vehicle body, is placed in operation and draws air from the return air conduits 23 and 24 and exhausts it under pressure into the air space 19 below the brine tank, from which space the air passes upwardly around the sides of the brine tank and through the tubes 15, then upwardly through the mass of melting cracked ice and outwardly through the air supply conduit 29 through which it is distributed over the entire upper portion of the storage space. Control of the temperature of the load may be had by controlling the speed of operation of the blower or by controlling the circulation of air through adjustment of the baffle plate 36.

The initial cooling characteristics of the mixture is, of course, determined by the proportions of salt and ice as well as the size of the cracked ice. However, it should be noted, in connection with the usual ice bunker system of refrigerating, that when the ice begins to melt, most of the salt is washed down and carried away in the waste water. Obviously, when this salt is gone the temperature of the air passing over the ice will not be lower than 32° Fahrenheit.

In a device constructed in accordance with my invention, salt in any quantity may be added to the ice and when it is washed down through melting of the ice, it is received in the brine tank. If sufficient salt has been added, the brine in this tank will be a saturated solution and the undissolved salt will settle to the bottom of the tank from which point it will be picked up and dissolved as the brine is diluted with melted ice.

When a sufficient amount of the ice has been melted to fill the brine tank to the level of the upper ends of the tubes 15, the overflow brine trickles downwardly over the inner surfaces of these tubes, and drips off the lower ends of the tubes onto the baffle plate 36. The air from the blower passing over these surfaces is not only partly cooled by contact therewith, but since this air has just passed through the produce storage space and is relatively warm and humid, at least part of the moisture in the air will be condensed out by the cool surfaces and, practically all of the heat absorbing capacity of this cold water is made use of before it passes out through the drain 49. The normal movement of the vehicle when it is in transit is sufficient to cause the brine in the brine tank to splash about and keep the coldest brine in contact with the tubes as well as to cause the water to trickle evenly down over the inside of all of the tubes.

It may now be understood that a cooling unit constructed in accordance with my invention makes it possible to secure an extremely low temperature and to maintain that temperature as long as any reasonable quantity of ice remains without the necessity for enclosing the salt and ice mixture in a closed system which necessitates the use of radiators, brine pumps and conduits, and a blower or blowers for transferring heat from the produce to the brine in the radiators. I have provided an inexpensive apparatus for securing cooling through the use of readily obtainable ice and salt, with means for using these materials to the very best advantage and efficiency and for preventing the loss of the salt normally experienced with the usual equipment without employing the very expensive and cumbrous equipment above mentioned and heretofore used to overcome this condition.

With a structure such as I have shown and described, it is possible to ship produce over extremely long distances and maintain the temperature of the produce at any relatively low degree desired without the necessity of periodically re-salting the ice and subjecting the produce to continually fluctuating temperatures.

By means of a structure such as I have herein shown, it is possible to make shipment of produce such as berries or the like over extremely long distances, which has heretofore been extremely difficult to do without a large amount of spoilage. Berries may be held to any temperature desired, and prior to unloading from the vehicle, such produce may be subjected to fresh air passed over its surfaces by opening the fresh air intake and exhaust openings. The motion of this fresh air throughout the mass of produce will serve to pick up and carry away any condensation formed on the surface of the produce when the warmer outside air contacts the cold surfaces of the produce.

Although I have shown and described a specific embodiment of my invention, it is apparent that modifications thereof may be made by those skilled in the art. Such modifications may be made without departing from the spirit and scope of my invention as set forth in the appended claims.

I claim as my invention:

1. In a cooling system for enclosed spaces using ice and salt, an enclosing conditioning chamber, a brine tank for receiving brine from melted ice and supporting ice within the conditioning chamber, conduit means for supplementing the heat transfer surfaces of the brine tank, and means including said conduit means for circulating air from the space to be cooled over the heat transfer surfaces of the brine tank and through the mass of ice.

2. In a device of the character described employing ice and salt or the like as a cooling agent, an ice bunker, an open-top brine tank in the lower part thereof, said brine tank having a plurality of air conduction tubes extending upwardly through the bottom thereof, means for preventing loss of ice downwardly through the tubes and arranged to permit the projection of portions of the ice into the tank between the tubes, and means for passing air upwardly through the tubes and over the outer surfaces of the brine tank for transferring heat from the air thereto, the brine tank adapted to receive and retain a large proportion of the salt washed down off of the melting ice.

3. In a device of the character described employing ice and salt or the like as a cooling agent, an ice bunker, on open-top brine tank in the lower part thereof, said brine tank having a plurality of air conduction tubes extending upwardly through the bottom thereof, means for preventing loss of ice downwardly through the tubes and arranged to permit the projection of portions of the ice into the tank between the tubes, means for passing air upwardly through the tubes and over the outer surfaces of the brine tank for transferrng heat from the air thereto, the brine tank adapted to receive and retain a large proportion of the salt washed down off of the melting ice, the said tubes being of less height than the height of the brine tank whereby overflow brine will pass downwardly over the inner surfaces, forming a cooling film thereon and drip off the lower ends of the tubes, whereby air passing upwardly through the unit will contact said inner surfaces of the tubes and the film of brine thereon and transfer heat thereto.

4. In a produce transport vehicle, an ice bunker in one end thereof, an air supply conduit leading therefrom, a return air conduit leading thereto, a blower connected to the return air conduit and discharging into the ice bunker, a fresh air intake adjacent the supply conduit, a discharge opening, and valve means for selectively directing air from the blower through the ice bunker or through the discharge opening.

5. In an ice cooling system for vehicles, an ice bunker, a brine tank disposed in the lower part thereof, said brine tank having a relatively large amount of heat transfer surface, and means including a portion of said heat transfer surface for passing air to be cooled through the brine tank and into the mass of ice and salt, said means being adapted to receive the overflow from the brine tank to cool the heat transfer surface of said means.

6. In a cooling system employing ice and salt or the like, an ice bunker, a brine tank within the ice bunker and having its side wall spaced from the side walls of the ice bunker, said brine tank serving as means for receiving at least a part of the ice in the bunker and for receiving melted ice and salt therefrom, and means, including the walls of said bunker and said tank and conduit means extending through said tank, for directing air to be cooled through the space between the side walls of said bunker and the side walls of the brine tank and through the ice in the ice bunker.

7. The combination with a vehicle having a body of a cooling system therefor adapted for the use of ice and salt or the like as a cooling agent, an ice bunker disposed in one end of the vehicle body, a brine tank disposed at a spaced distance from the bottom of the ice bunker and having its side walls spaced from the side walls of the bunker to permit air to pass upwardly therebetween, the brine tank having a plurality of air tubes extending upwardly from the bottom thereof, means for preventing passage of ice downwardly through the tubes but permitting the passage of air upwardly therethrough, return air ducts disposed adjacent the floor of the vehicle body, a blower having the intake thereof connected to the return air ducts and discharging into the ice bunker below the said brine tank, and a supply conduit disposed in the upper portion of the vehicle body and connected to the top of the ice bunker for conducting refrigerated air therefrom and for distributing same over the upper regions of the vehicle body, the said brine tank adapted to receive ice and brine resulting from the melting of the ice by the salt thereabove, the system being so arranged that heat in the air passing through the unit may be transferred to the brine through the walls of the brine tank and through the walls of the tubes before passing upwardly through the ice in the ice bunker.

GEORGE B. PIRNIE.